Dec. 30, 1969    C. E. RIVE    3,486,243
LIGHT RAY EDUCATIONAL APPARATUS
Filed April 20, 1966    2 Sheets-Sheet 1
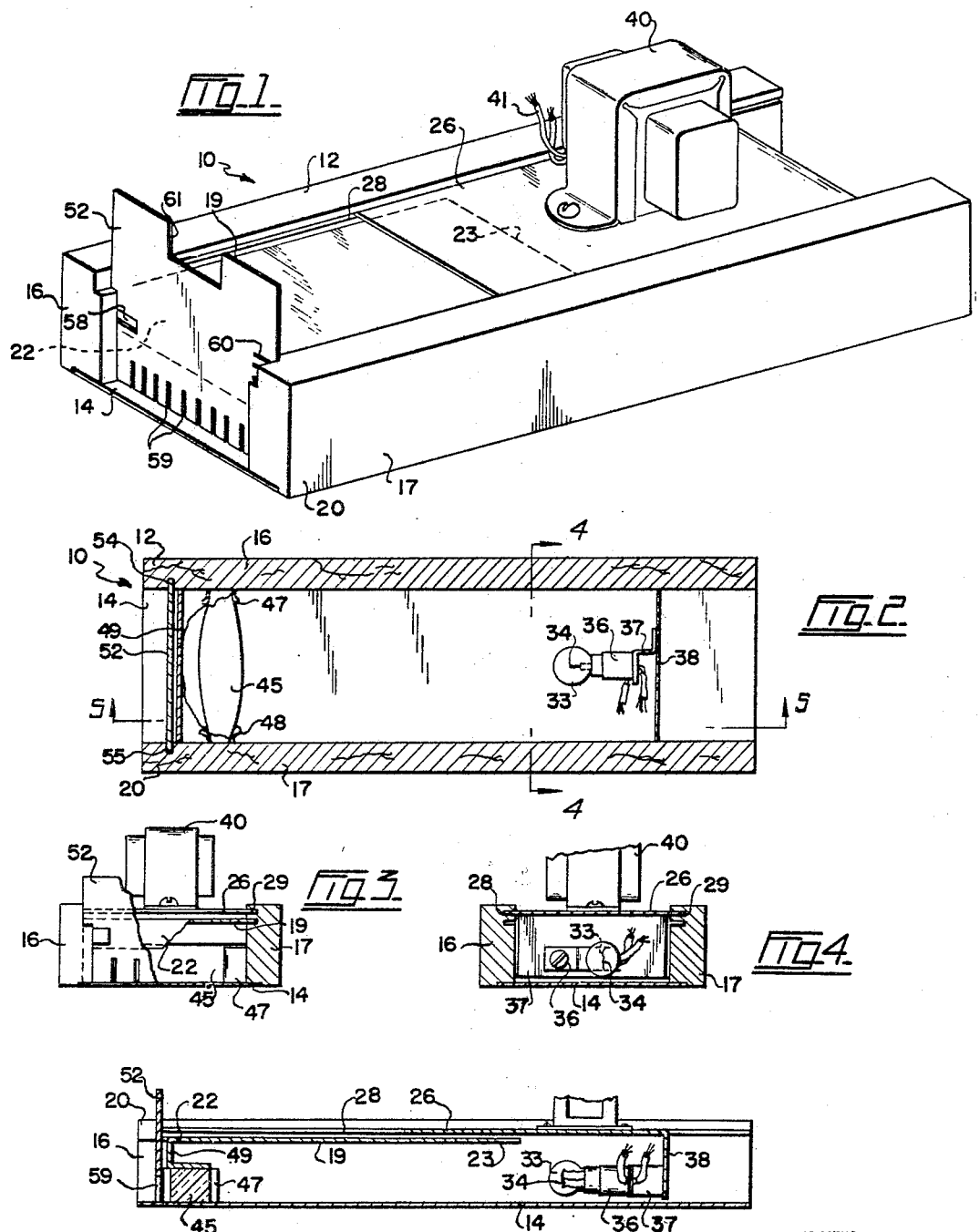
INVENTOR
CHARLES E. RIVE
BY
Fetherstonhaugh & Co.
ATTORNEYS Dec. 30, 1969  C. E. RIVE  3,486,243
LIGHT RAY EDUCATIONAL APPARATUS
Filed April 20, 1966  2 Sheets-Sheet 2
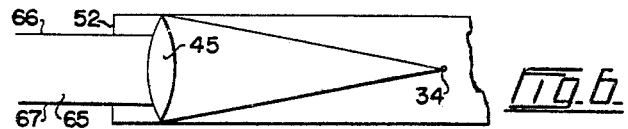
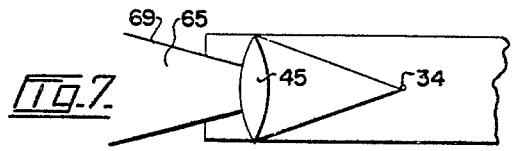
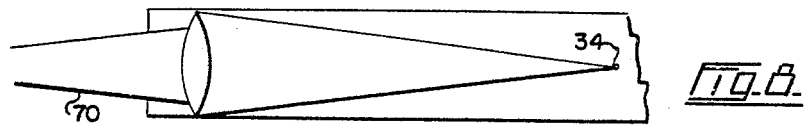
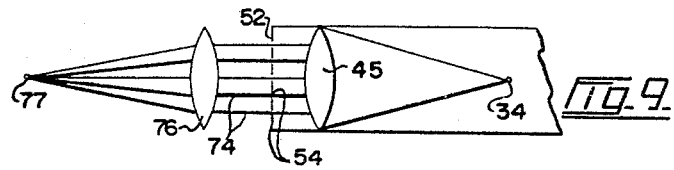
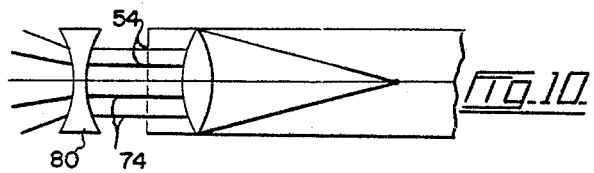
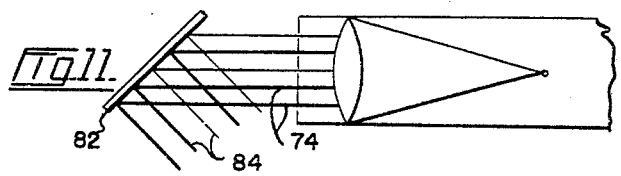
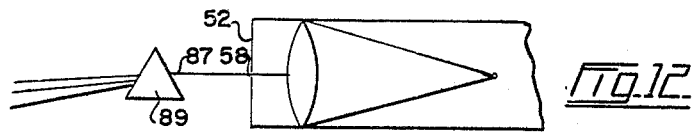
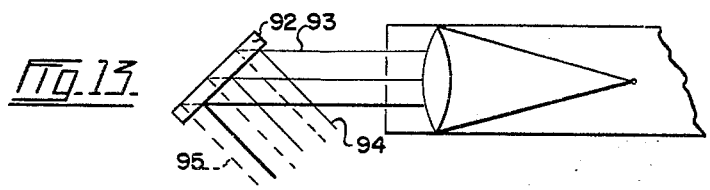
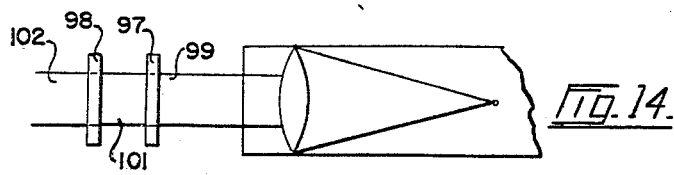
INVENTOR
CHARLES E. RIVE
BY
Fetherstonhaugh & Co.
ATTORNEYS

United States Patent Office 3,486,243
Patented Dec. 30, 1969

3,486,243
LIGHT RAY EDUCATIONAL APPARATUS
Charles E. Rive, 2233 Alden Lane, North Vancouver,
British Columbia, Canada
Filed Apr. 20, 1966, Ser. No. 543,988
Int. Cl. G09b 23/06
U.S. Cl. 35—19                    14 Claims

ABSTRACT OF THE DISCLOSURE

Apparatus to be used in teaching the behavior of refracted or reflected light rays, and including a housing having an opaque screen along one end thereof with at least one rectangular slot in the screen extending normal to the housing base, a light source having a thin line filament and carried by mounting means in the housing movable towards and away from the screen, and a lens in the housing between the light source and the screen, whereby movement of the filament towards and away from the screen selectively causes the beam of light passing through the lens and said slot to emerge as a ray having diverging, parallel or converging sides, depending upon the position of the filament relative to the lens.

---

This invention relates to apparatus to be used in teaching about the behavior of light by observing and/or tracing light rays as they are reflected and refracted or otherwise altered by various optical components.

An object of the present invention is the provision of apparatus which acts as a visual aid in teaching about light behavior, and particularly about the effect on light rays of components, such as lenses, reflectors, prisms, light filters, and the like.

Another object is the provision of educational apparatus for producing one or more rays of parallel light which is so simple and inexpensive that schools can have enough of these devices to allow the use of one by groups of pupils of from 1 to 3 or 4 during instruction periods.

A further object is to provision of light ray educational apparatus which can be adjusted to produce diverging or converging light rays.

Another object is the provision of light ray educational apparatus having its own source of light and which may be connected to standard lighting systems.

A still further object is the provision of apparatus which may be used by pupils in the production of permanent and exact records of the effect of different light ray altering components on light rays.

A still further object is the provision of light ray educational apparatus which utilizes a large percentage of the light produced so that a very small and inexpensive light source can be used.

Light ray educational apparatus according to the present invention includes a housing having a base. This base is preferably flat so that the housing can be laid against a flat surface. A light source is mounted in the housing, said source having a thin line filament extending normal to the base. A convex cylindrical lens is provided in the housing between said filament and an opaque screen at one end of the housing, said screen having at least one opening, usually a rectangular slot, therein at the level of the base and parallel with the filament. The lens is adapted to produce a parallel-sided light beam when light from the filament passes therethrough. Although not absolutely necessary, it is preferable to mount the light source so that it can be moved towards and away from the lens in order to produce diverging and converging light beams.

In actual practice, it is preferable removably to mount the screen at the housing end so that different screens may be used, and/or a screen may have a different number of slots and/or slots of different widths at the four sides thereof.

The apparatsu of this invention also includes, in combination with the housing, one or more light ray altering components to be positioned in the path of the ray or rays passing through the screen slot or slots. These altering components can be lenses, such as double convex and double concave cylindrical lenses, flat or curved cylindrical reflectors, prisms, light filters, and the like. These components alter the light rays by changing their direction or color composition. This apparatus has many different uses. For example, a plurality of parallel rays can be projected from the housing and screen, these rays being made to converge or diverge by different types of lenses, or to reflect back at different angles by an angularly arranged reflector; or a single parallel sided ray can be directed on to a prism in order to break the light down into a spectrum; or a light ray may be projected on or through one or more light filters to illustrate different effects of filters on light rays.

The light ray apparatus is constructed so that when it is placed on a sheet of paper, the ray or rays passing through the screen are clearly visible on said sheet. With this arrangement, when a light refracting component is placed in the path of the ray or rays, its effect on the rays can be clearly seen. In addition, a pupil can trace on the paper the exact ray patterns or illustrate the effects of said components.

Examples of this invention are illustrated in the accompanying drawings, in which, FIGURE 1 is a perspective view of the light ray educational apparatus, FIGURE 2 is a plan view of the apparatus with the top portions thereof cut away, FIGURE 3 is an elevation of the front end of the apparatus, FIGURE 4 is a vertical section taken on the line 4—4 of FIGURE 2, FIGURE 5 is a longitudinal section through the apparatus and taken on the line 5—5 of FIGURE 2, and FIGURES 6 to 14 are diagrams illustrating different things that can be done with this apparatus.

Referring to FIGURES 1 to 5 of the drawings, light ray educational apparatus 10 includes a housing 12 having a thin flat base 14 and parallel side walls 16 and 17 extending upwardly therefrom. A suitable cover is provided for housing 12. In this example, a cover section 19 is fixedly mounted on the housing and extends between side walls 16 and 17 near the front end 20 of the housing. Cover section 19 has a front edge 22 spaced inwardly from front end 20 of the housing, and a rear edge 23 terminating approximately midway between the ends of the housing. Another cover section 26 is slidably mounted on housing 12. In this example, cover section 26 is slidably mounted in slots 28 and 29 formed in the inner surfaces of side walls 16 and 17, said cover section being adapted to close the portion of the top of housing 12 not closed by cover section 19, and to slide over section 19 towards and away from the front end 20 of the housing.

A suitable light source is carried by cover section 26 in housing 12. The light source is preferably a 12 volt light bulb 33 having a thin line filament 34 which extends normal to housing base 14. Bulb 33 fits in a suitable socket 36 carried by a bracket 37 mounted on a flange 38 depending from the rear edge of cover section 26. A suitable transformer 40 is mounted on cover section 26 and is electrically connected to socket 36 to supply power to bulb 33. Transformer 40 has wires 41 extending therefrom by means of which said transformer can be connected to a standard light circuit. In places where the standard voltage is 110 volts, this transformer will step down the voltage to 12 volts for lamp 33. It will be noted that this lamp is located near base 14 so that filament 34 is just above the latter.

If desired, transformer 40 may be replaced by a suitable battery as a power source for bulb 33.

A lens 45 is mounted in housing 12 between light source 33 and the housing end 20. This lens is adapted to produce a parallel-sided light beam when light from filament 34 passes therethrough. In this example, a cylindrical double convex lens is used, and this is removably mounted in spring clips 47 and 48 mounted on the adjacent walls 16 and 17. Lens 45 is directly in front of vertical filament 34 and rests on base 14. A flange 49 projects downwardly from front edge 22 of cover section 19 to the top of lens 45 in order to prevent any light from passing out of the housing above this lens. The inside surfaces of housing 12 and its cover should be finished in a non-reflective flat black so that no reflected light is directed towards lens 45.

Although the front end 20 of housing 12 may be closed by a fixed wall or screen, it is preferable to provide an opaque screen 52 which removably fits in vertical slots 54 and 55 formed in walls 16 and 17 at or slightly inwardly from the front end 20 of the housing, as clearly shown in FIGURE 1. This screen is preferably square so that when a lower side or edge thereof rests on base 14, the screen projects upwardly above the housing. The reason for this is that screen 52 is formed with one slot 58 in one edge thereof, a plurality of fairly closely spaced slots 59 in another edge, three slots 60 spaced from each other in another edge, and a single large slot or opening 61 in the remaining edge.

When transformer 40 of apparatus 10 is connected to a suitable source of electrical power, light is directed by source or lamp 33 onto lens 45. When it is desired to project a light beam having parallel sides, cover section 26 is moved along the top of housing 12 to position filament 34 relative to lens 45 to produce the parallel-sided light beam. When screen 52 is fitted into slots 54 and 55 with its large slot 61 positioned at base 14, a large beam 65 is produced having parallel sides 66 and 67, see FIGURE 6. If the filament is moved towards lens 45, the sides of beam 65 diverge, as shown at 69 in FIGURE 7. On the other hand, if the filament is moved away from the lens, the sides of the beam converge, as indicated at 70 in FIGURE 8. The dull finish of the interior of housing 12 prevents reflected light from entering lens 45 at an angle that would interfere with the formation of the type of beam required.

FIGURES 9 to 11 diagrammatically illustrate the apparatus in use with screen 52 positioned so that its plurality of closely spaced slots 54 are positioned at base 14, and filament 34 is positioned to cause a parallel-sided beam to be produced by lens 45. This results in the production of a plurality of parallel light rays 74 distinctly separated from each other, as shown in FIGURES 9 to 11. When a cylindrical double convex lens 76 is placed in the path of rays 74, these rays converge to a focus point 77. When apparatus 10 is placed on a sheet of paper, the fact that the rays 74 are produced on base 14 of the housing results in these rays being low enough to be visible on the sheet so that a student can trace the rays on the paper, the effect being as shown in FIGURE 9. Thus a permanent record of the effect of lens 76 on the parallel rays 74 can be drawn, and as the pupil sees this effect for himself, it is more likely to stay with him than if someone were to draw the rays and merely explain that this is what happens.

FIGURE 10 illustrates the effect on rays 74 when a cylindrical double concave lens 80 is placed in the path of the rays.

A flat reflector 82 placed angularly across the path of rays 74 produces the reflected rays 84, as seen in FIGURE 11. The angle of reflector 82 can be changed relative to rays 74, and the effect of this change will be clearly seen by the pupil.

FIGURE 12 illustrates the apparatus producing a single paralle-sided ray 87 through the single slot 58 of screen 52 when said slot is positioned at base 14. A prism 89 placed in the path of ray 87 refracts this ray to produce a spectrum.

FIGURE 13 illustrates the apparatus with a color filter 92 used as a reflector and angularly positioned in the path of three light rays 93. Three white light rays 94 and three color rays 95 are reflected by filter 92, the color of rays 95 depending upon the type of filter used.

FIGURE 14 shows the apparatus with two different light filters 97 and 98 extending across a single wide beam 99. For example, 97 is a yellow screen and 98 a blue screen. As a result, beam 101 from filter 97 is yellow, and beam 102 from filter 98 is green. This illustrates the blending of colored light to produce other colors.

From the above it will be seen that apparatus 10, although it is extremely simple in construction and operation, can be used to demonstrate the effect of many different light-altering components on one or more rays of light, only a few of which are illustrated and described herein. This apparatus produces one or more parallel-sided rays in a very simple and economical manner. As a result of this, a school can have many of these devices for a single class so that every pupil can have an opportunity to use the apparatus and to produce the many different effects possible during this use. An advantage of this apparatus is that by using a single thin line filament as a light source and arranging each slot of screen 52 so that when it is in operation, it is parallel with the filament, comparatively little light is wasted in producing the parallel beams or rays. As the light emerging from lens 45 is parallel sided, there is no divergence of the rays passing through the screen slots regardless of whether the screen is positioned close to the lens, as shown, or spaced outwardly therefrom.

What I claim as my invention is:

1. Light ray educational apparatus comprising a housing having a base to be laid against a flat surface, an opaque screen closing one end of the housing and having at least one rectangular slot therein at the level of the base and extending normal thereto, a rectangular horizontal plate in the housing adjacent the opposite end thereof and mounted for movement longitudinally of the housing towards and away from said screen, said housing having spaced grooves receiving the edges of the plate, a light source carried by said plate and having a thin line filament extending normal to the base substantially at the level of said slot, and a lens lying across the housing between the screen and the filament, said lens being adapted to produce a parallel-sided light beam when said filament is positioned at the focal point of the lens and light from the filament passes therethrough and being positioned to direct said beam over the base on to the screen, some of said beam passing through the screen slot and movement of the plate and the filament longitudinally of the housing selectively causing the light to emerge as a ray having diverging, parallel or converging sides, depending upon the position of said filament relative to the lens, and said ray travelling over and near the flat surface against which the base is laid so that said ray can be seen along the length thereof on said surface and traced thereon.

2. Educational apparatus as claimed in claim 1 in which the screen has at least one additional rectangular slot therein through which a portion of the beam can pass.

3. Educational apparatus as claimed in claim 1 including in combination with said housing, a light ray altering component to be positioned in the path of the ray passing through the screen slot.

4. Educational apparatus as claimed in claim 3 in which said ray altering component is a lens.

5. Educational apparatus as claimed in claim 3 in which said ray altering component is a reflector.

6. Educational apparatus as claimed in caim 3 in which saild ray altering component is a prism.

7. Educational apparatus as claimed in claim 3 in which said ray altering component is a light filter.

8. Light ray educational apparatus comprising a housing having a flat base to be laid against a flat surface and having an open end, a rectangular horizontal cover plate section slidably mounted on the housing for movement longitudinally thereof towards and away from said open end, said housing having spaced grooves receiving the edges of the plate, a light source mounted on said cover plate and in the housing and having a thin line filament extending normal to said base, an opaque screen removably mounted over said open end and having a plurality of rectangular slots extending inwardly from different edges thereof, said screen being changeable relative to said housing end to position a selected edge thereof adjacent the base, each slot being arranged so that when the screen edge of said each slot is positioned adjacent the base, said each slot is parallel with the filament, and a lens lying across the housing between the screen and the filament, said lens being adapted to produce a parallel-sided light beam when said filament is positioned at the focal point of the lens and light from the filament passes therethrough and being positioned to direct said beam over the base onto the screen, some of said beam passing through each screen slot and movement of said cover plate and the filament longitudinally of the housing selectivley causing the light to emerge as a ray having diverging, parallel or converging sides, depending upon the position of said filament relative to the lens, and said ray travelling over and near the flat surface against which the base is laid so that said ray can be seen along the length thereof on said surface and traced thereon.

9. Educational apparatus as claimed in claim 8 in which said light source is a 12 volt bulb, and including a stepdown transformer mounted on the cover section of the housing for and electrically connected to said bulb and adapted to be connected to a standard electrical power source.

10. Educational apparatus as claimed in claim 8 including in combination with said housing, a light ray altering component to be positioned in the path of the ray passing through the screen slot.

11. Educational apparatus as claimed in claim 10 in which said ray altering component is a lens.

12. Educational apparatus as claimed in claim 10 in which said ray altering component is a reflector.

13. Educational apparatus as claimed in claim 10 in which said ray altering component is a prism.

14. Educational apparatus as claimed in claim 10 in which said ray altering component is a light filter.

References Cited

UNITED STATES PATENTS 2,935,797   5/1960   Morris _____ 35—19

FOREIGN PATENTS 922,181   1/1947   France.

EUGENE R. CAPOZIO, Primary Examiner

HARLAND S. SKOGQUIST, Assistant Examiner